Sept. 1, 1925.
H. I. SHIRE
ELECTRIC INDICATOR
Filed Oct. 27, 1919
1,551,704
2 Sheets-Sheet 1
Fig:1.
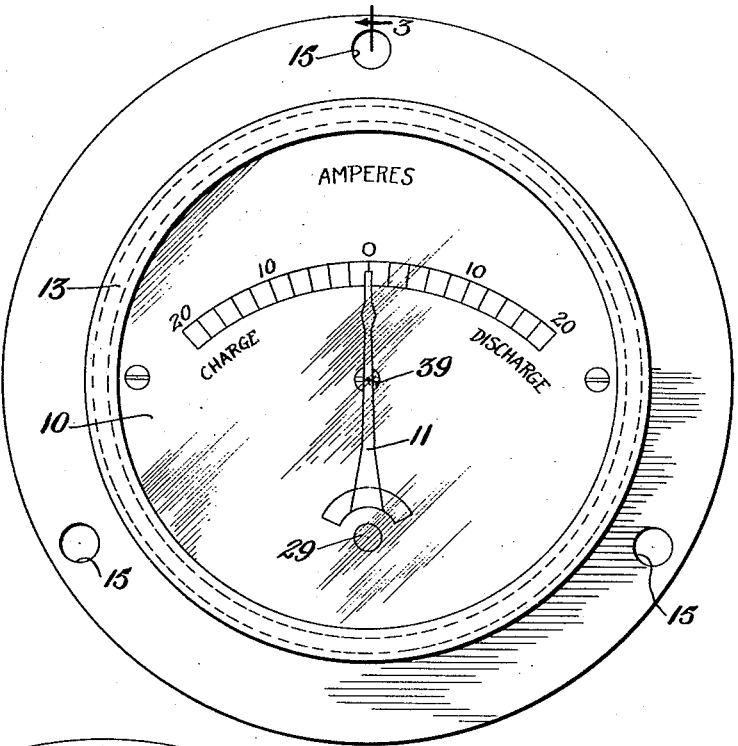
Fig:2.
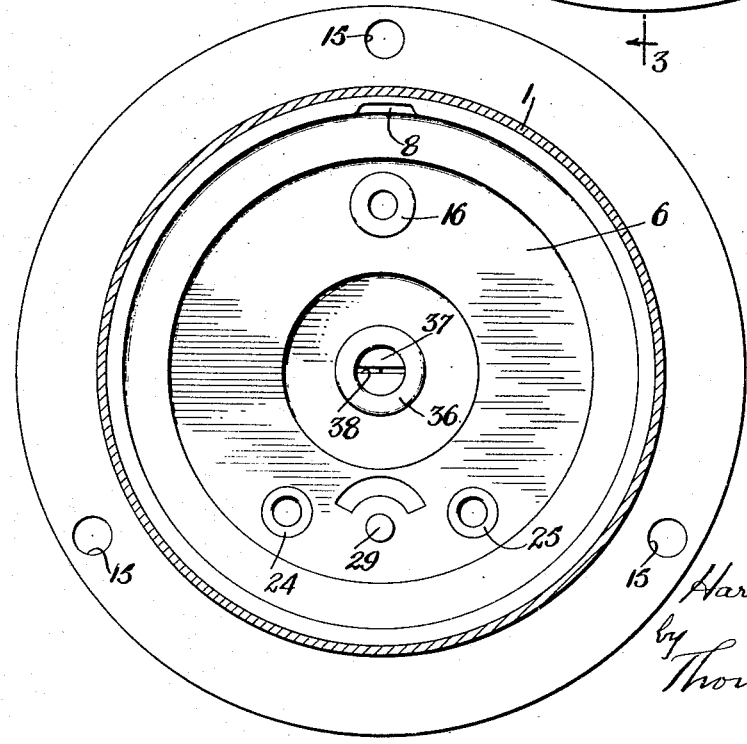
Inventor
Harry I. Shire
by Thomas Howe
Attorney

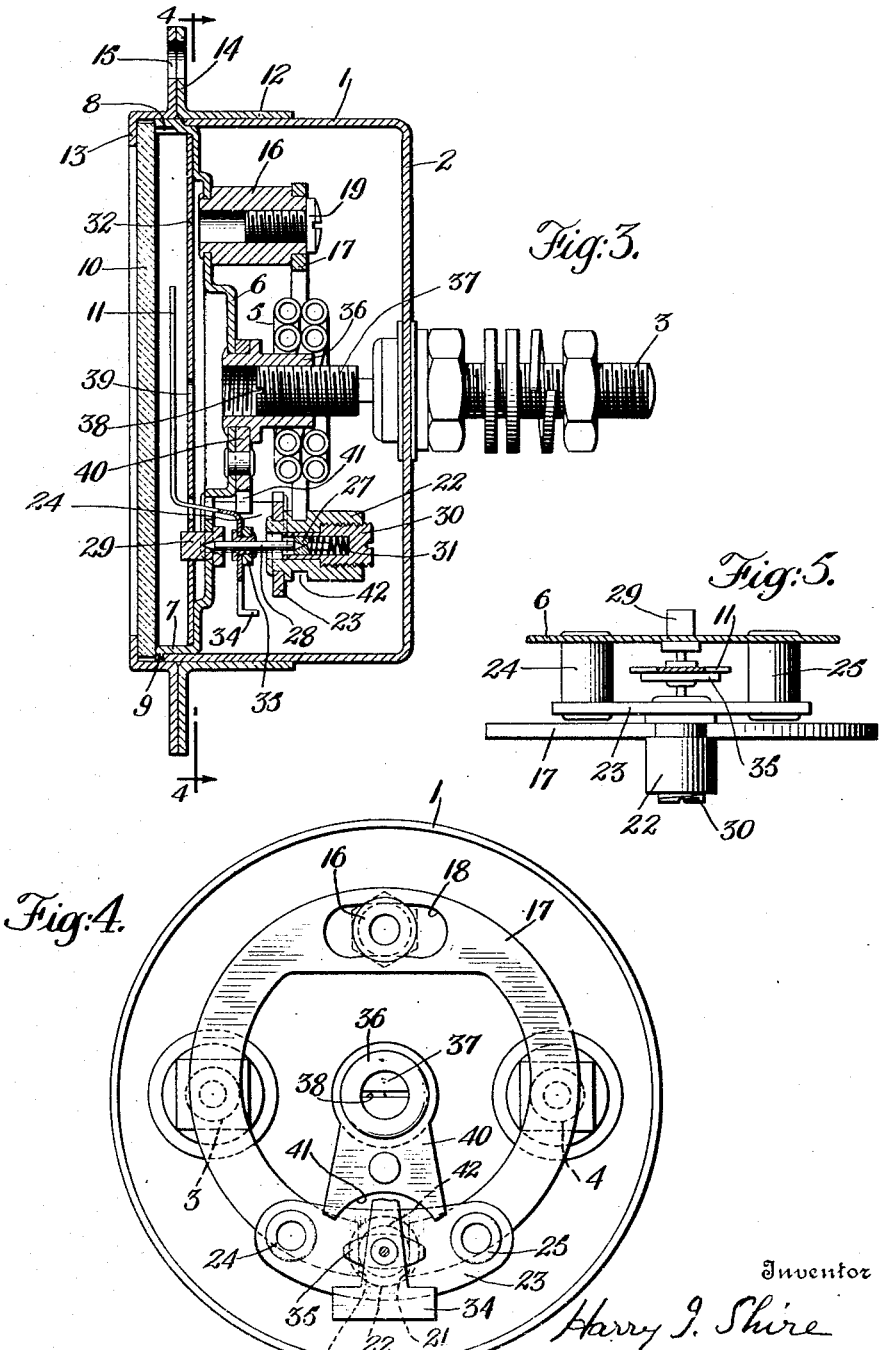

Patented Sept. 1, 1925.

1,551,704

UNITED STATES PATENT OFFICE.

HARRY I. SHIRE, OF DETROIT, MICHIGAN.

ELECTRIC INDICATOR.

Application filed October 27, 1919. Serial No. 333,515.

*To all whom it may concern:*

Be it known that I, HARRY I. SHIRE, a citizen of the United States of America, residing at city of Detroit, county of Wayne, and State of Michigan, have invented new and useful Improvements in Electric Indicators, of which the following is a specification.

This invention relates to means for indicating electrical conditions and is especially adapted for use in connection with the construction of ammeters.

One object of the invention is to provide an improved location and arrangement of the current coil with relation to the other parts of the apparatus.

A further object of the invention is an improved structure of core or magnetic circuit whereby accuracy of adjustment of the parts is maintained.

A further object of the invention is to provide a means accessible from the front of the instrument for varying the effect of the current coil on a movable armature which it acts upon.

A further object of the invention is to provide an adjustable magnetic core for the coil, so that calibration or adjustments of the indicator needle may be effected without disturbing the relative positioning of the parts which would tend to prevent accuracy of operation upon the part of the meter.

A further object of the invention is to provide improved means for adjusting the permanent magnet where such is employed so as to cause the pointer to properly register with the scale or dial without destroying other adjustments of the instrument.

A further object of the invention is to provide a structure, the parts of which are readily assembled.

A further object of the invention is to so assemble the parts that a steel case may be employed which will protect the enclosed instrument from stray-magnetic fields and from the effects of short circuits.

A further object of the invention is to provide improved means for effecting a dead beat indicator.

It is a further object to provide bearings which shall firmly hold the rotatable element.

Other and ancillary objects of the invention will appear hereinafter.

In the accompanying drawings which illustrate the invention—

Fig. 1 is a front face view of an ammeter embodying the invention;

Fig. 2 is a front view of the instrument with the glass indicator needle and dial plate removed so as to show the front of the mechanism plate;

Fig. 3 is a section on the line 3—3 of Fig. 1;

Fig. 4 is a section on the line 4—4 of Fig. 3 with the mechanism plate and outside flange removed; and Fig. 5 is a fragmentary view showing in side elevation the ends of the horse-shoe magnet and adjacent parts.

Referring to the drawings, the instrument comprises a steel casing having the circular side walls 1 and back 2. Secured to but insulated from the back 2 are two studs 3 and 4 by which electrical connections to the instrument are made. The ends of an electrical coil 5, are secured to the studs 3 and 4 respectively so that electrical connection with the coil is made through the studs. The wire of the coil is insulated and it is of such size as to be self-sustaining so that the coil is supported from the studs.

A brass mechanism plate 6 has a flange 7 which fits within the side walls of the casing and a tongue or projection 8 which enters within a corresponding notch or recess in the casing and thus prevents relative rotation of the plate and casing, and has a lip 9 engaging the front edge of the side walls of the case so as to limit the sliding of the mechanism plate therein. Bearing upon the lip 9 is the front glass plate 10 through which the indicator 11 is observed, this plate being held in position by means of a sleeve 12 sliding upon the outside of the circular walls of the case, having a flange 13 overlapping the front face of the glass 10 for holding the latter in position, and also a flange 14 provided with bolt or screw holes 15 for securing the instrument to a support.

Mounted upon a brass post 16 which is secured to the mechanism plate 6 is a permanent steel magnet 17 of the horse-shoe type. The upper end of the post 16 passes through a slot 18 of the magnet which is held in any position to which it may be adjusted by sliding it about the post 16, by means of a screw 19 tapped into the top of the post. The poles 20 and 21 of this magnet bear against a brass post 22 which is mounted in a plate 23 which in turn is mounted upon the posts 24 and 25 mounted in the mechanism plate 6. Sliding within the post 22 is a bearing 27 for the staff 28, while the other end of the staff engages with a bearing 29 secured in the mechanism plate 6. The bearing surfaces for the staff are of the usual conical type familiar in electrical meter and instrument structures.

The pressure upon the bearings may, however, be adjusted by means of the plug 30 screw-threaded into the top of the post 22, a spring 31 being interposed between the plug and the bearing 27 as shown. By screwing down on the plug and putting the spring under greater or less compression, the pressure between the bearings and the ends of the spindle may be made any that is desired. It is to be observed that the recess in the bearing 29 for receiving the end of the rotatable staff 28 is of such depth that it is impossible for the staff to leave the bearing no matter how much the spring 31 may be compressed. This is important as it prevents dislocation of the rotatable member of the instrument when it is dropped or otherwise subjected to shocks or jars.

It has been found that the operation of the instrument, so far as being dead beat and firmly holding the rotatable element is concerned, is greatly improved by making the pressure upon the bearings greater than the weight of the staff and its carried members. Fixed upon the staff so as to turn therewith is the pointer 11 moving over the dial plate 32 and having a counter-weight portion 34 which serves to balance the indicating end about the staff. Also fixed upon the staff is the armature 35 of magnetic material mounted below the gap between the poles of the permanent magnet so as to be acted on by the flux between the poles, whereby the magnet tends to set its length of greatest diameter across the gap as shown in Fig. 4.

The coil 5 has a magnetic core comprising a sleeve 36 of magnetic material in which is screw-threaded a member 37 of magnetic material whereby the magnetic circuit of the coil may be adjusted. The front end of this member has a slot 38 for a screw driver which may be reached by inserting the screw driver through a hole 39 in the dial plate and into the end of the sleeve 36 which projects through a hole in the mechanism plate 6 as shown. The core also comprises a member 40 of good magnetic material secured to the mechanism plate and in intimate magnetic relation to the sleeve 36. This member 40 terminates in a pole piece 41 in proximity to the armature 35.

The armature and consequently the pointer 11 will take up a position which will depend upon the resultant action of the magnetism of the coil 5 and of the flux of the permanent magnet. The relative effects of the two magnetisms upon the armature may be made to vary by screwing the member 37 back and forth thereby altering the magnetic circuit of the coil 5 and consequently its effect upon the armature. It is desirable, however, that the portions of the magnetic circuit adjacent the armature, namely the pole piece 41 shall be in permanent relationship to the axis of the armature so that any adjustment will not affect this relationship.

By the apparatus described, the instrument can be calibrated by varying the magnetic circuit of the coil 5 as described without disturbing the relationship of the armature to the immediately adjacent parts of the magnet core.

In order to bring the needle into registry with any particular part of the dial as for instance on zero, it may be desirable to shift the angular direction of the magnetism acting upon the armature but without changing it bodily. This can be effected with the apparatus shown by loosening the screw 19 and sliding the magnet at that point in one direction or the other when the magnet will turn about the post 22, that is about the axis of the staff, the ends or poles of the permanent magnet being entered within the circumferential groove 42 in the post 22 and bearing against the post at the base of the groove so as to turn thereon.

It is desired, however, that the cross-section of the permanent magnet shall not be decreased by reason of the slot 18 being in it and it is accordingly thickened at this point so as to have a uniform cross-section throughout of magnetic material.

While the invention has been illustrated in what is considered its best application, it may have other embodiments without departing from its spirit and is not therefore limited to the structure shown in the drawings.

What I claim is:

1. In an electrical indicating instrument, the combination with a case comprising a back and sides, of studs in the back of said case, a coil within said case and connected to said studs, a mechanism-plate fitting within the sides of the case and a magnet, a pivoted armature, an L-shaped core for said coil and an indicating pointer mounted upon said plate, said plate holding said core in operative relation to said coil and said coil being supported independently of said plate.

2. In an electrical indicating instrument, the combination with a case, of a magnet, a coil, a pivoted armature acted upon by the fluxes of said magnet and coil, a core for said coil and means accessible from the front of the instrument for regulating the magnetic circuit of said coil.

3. In an electrical indicating instrument, the combination with a case, of a coil therein, a plate fitting therein and a magnet, a pivoted armature and a core for said coil mounted upon said plate, said core having an adjustable member for regulating the magnetic circuit of said coil and said plate having a hole through which access may be had to said adjustable member.

4. In an electrical indicating instrument, the combination with a case, of a coil therein, a plate fitting therein and a magnet, a pivoted armature and a core for said coil mounted upon said plate, said core having an adjustable member for regulating the magnetic circuit of said coil and said plate having a hole through which access may be had to said adjustable member, said adjustable member being screw-threaded in said core and in line with said hole in said plate.

5. In an electrical indicating instrument, the combination with a circular case having a back and sides, of a circular plate fitting within the sides of said case and carrying a magnet, and a pivoted armature, a coil mounted on said case and in operative relation to said armature and a ring surrounding and telescoping with the sides of said case, said ring having a flange adapted to hold the glass face of the instrument in position and also an outwardly extending flange for securing the instrument in position.

6. In an electrical indicating instrument, the combination with a case, of a magnet therein, a coil therein, a pivoted armature in operative relation to said magnet and said coil and a core for said coil extending into proximity to said armature, said core having an adjustable member to vary its magnetic effect upon said armature, but that portion of the core closest to said armature being relatively fixed.

7. In an electrical indicating instrument, the combination with a coil, of a magnet, an armature acted upon by said coil and said magnet, said magnet being pivoted to swing about the axis of said armature as a center and means for holding said magnet in its various positions of adjustment the axes of said coil and armature being non-coincident and substantially perpendicular to the plane of said magnet.

8. A magnetic structure for an indicating instrument comprising a magnet and a support for the same entering between the poles of said magnet the ends of said magnet bearing against said support and forming a bearing between said poles, on which said magnet turns.

9. A magnetic structure for an indicating instrument comprising a magnet and a support for the same entering between the poles of said magnet the ends of said magnet bearing against said support and forming a bearing between said poles, on which said magnet turns, said support being grooved to receive the extremities of said magnet.

10. A magnetic structure for an electrical instrument comprising a magnet, a support therefor entering between the poles of said magnet the ends of said magnet bearing against said support and forming a bearing between said poles, on which said magnet turns and a second support engaging said magnet at its central portion.

11. A magnetic structure for an electrical instrument comprising a magnet, a support therefor entering between the poles of said magnet and a second support engaging said magnet at its central portion, said magnet being adjustable on the last mentioned support to turn about the axis of the first mentioned support.

12. In an electrical indicating instrument, the combination with a case, of a coil therein, a pivoted armature in operative relation to said coil and a core for said coil extending into proximity to said armature, said core having an adjustable member to vary it's magnetic effect upon said armature, but that portion of the core closest to said armature being relatively fixed.

13. In an electrical indicating instrument, the combination with a case of a mechanism plate adapted to be fitted within said case substantially parallel to the back thereof, a coil in said casing between the back thereof and said plate, said coil being supported independently of said plate, a core, armature, and pointer mounted upon said plate, said core telescoping within said coil when inserted within said casing, and being withdrawn therefrom on removing said plate from said casing, the assembly and disassembly of the core and coil into and out of operative relation being effected entirely by the insertion and removal of the plate from the casing without the necessity of disconnecting either coil or core from its support.

14. In an electrical indicating instrument, the combination with a case of a mechanism plate adapted to be fitted within said case substantially parallel to the back thereof, a coil in said casing between the back thereof and said plate, said coil being supported independently of said plate, a core, armature, and pointer mounted upon said plate, said core and coil being adapted to be entirely operatively assembled and disassembled by the assembling and disassembling of said plate and case without the necessity of disconnecting either coil or core from its support.

15. In an electrical indicating instrument, the combination with a case of a mechanism plate, adapted to be fitted within said case substantially parallel to the back thereof, a coil in said casing between the back thereof and said plate, and having it's axis perpendicular to said back and plate, said coil being supported independently of said plate, a core, armature and pointer mounted upon said plate, said core and coil being adapted to be entirely operatively assembled and disassembled by the assembling and disassembling of said plate and case without the necessity of disconnecting either coil or core from its support.

16. An electrical indicating instrument, comprising in combination a magnet, a support therefor entering between the poles of the magnet and on which the magnet is adapted to turn, a pivoted armature, a coil and a core for said coil extending into proximity to said armature, said core having an adjustable member to vary its magnetic effect upon the armature, but that portion of the core closest to said armature being relatively fixed.

17. An electrical indicating instrument comprising in combination a case, a coil in said case, a mechanism plate, an armature, pointer and core for said coil mounted on said plate, a front piece through which said pointer is visible, and a common means for securing said front piece and said plate in operative relation to said case.

18. In an electrical indicating instrument, the combination with a pivoted armature, of means for exerting a magnetic influence upon said armature according to the electrical condition to be indicated, a staff upon which said armature is mounted, bearings for said staff, said bearings engaging with the ends of said staff in the normal operation of the instrument whereby pressure of said bearings on said staff may be varied with the armature in operative position by forcing the said bearings toward each other, one of said bearings being fixed and the other bearing being adjustably spring-pressed.

In testimony whereof I have signed this specification this 23rd day of October, 1919.

HARRY I. SHIRE.